A. B. SPROUT.
INSECT-TRAP.
No. 172,794. Patented Jan. 25, 1876.
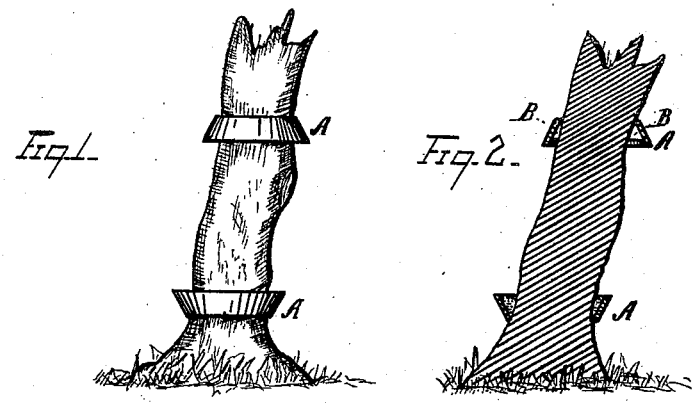
WITNESSES
E. J. Nottingham
Wm. H. Brereton Jr.
By
INVENTOR
Amos B. Sprout
Leggett & Leggett Attorneys.

UNITED STATES PATENT OFFICE.

AMOS B. SPROUT, OF PICTURE ROCKS, PENNSYLVANIA.

IMPROVEMENT IN INSECT-TRAPS.

Specification forming part of Letters Patent No. 172,794, dated January 25, 1876; application filed November 15, 1875.

*To all whom it may concern:*

Be it known that I, AMOS B. SPROUT, of Picture Rocks, in the county of Lycoming and State of Pennsylvania, have invented certain new and useful Improvements in Insect-Traps; and I do hereby declare the following to be a full, clear, and exact description of the invention, such as will enable others skilled in the art to which it pertains to make and use it, reference being had to the accompanying drawings, which form part of this specification.

My invention relates to insect-traps, and consists of a circular elastic band, provided on one side with wedge or beveled ribs or projections; the band being applied around the trunk or body of a tree, with the ribs against the tree and holding the lower edge of the circular elastic band out from the tree, the top edge of the band being held close and secured to the tree, as and for the purposes hereinafter set forth and shown.

The object of my invention is to prevent insects from crawling up fruit trees and depositing their eggs, or larva, in the fruit, and thereby causing the fruit to drop off before it comes to maturity, or rendering that which may seem to mature unfit for use, containing, as it does, the worm which produces the insect for the following season; also, to catch the canker and other worms which feed upon the leaves, &c. By the construction of the trap the insects are collected beneath it, thus enabling them to be destroyed.

The trap may also be used to destroy borers by inverting it and fastening it tight around the tree near the roots, and after closing any orifices between the edge of the trap and the bark of the tree with some adhesive waterproof material, such as putty, clay, &c., filling the cup thus formed with a liquid that will destroy them.

The band is made elastic to allow it to be turned up to destroy the insects beneath it.

I will now proceed to describe my invention with reference to the accompanying drawings, in which—

Figure 1 represents a view of a portion of a tree with my trap applied thereto in two ways; Fig. 2, a transverse section of same, showing the ribs on the under side of the band; Fig. 3, detached views of the band as removed from the tree.

A is a circular elastic band, of any desired or appropriate width and length to encompass a tree. On the under side of this band, running transversely of its length, or in short sections lengthwise, are ribs B, which taper toward one edge, as shown, so as, when the band is secured around the tree by tack or otherwise at its upper edge, the lower edge of the band will project some distance outward.

These ribs may be simply studs or projections near the outer edge of the band, so as to hold it in position.

The band may be applied to the tree and secured by nails at the upper edge, or by buckling, hooks and eyes, or other fastening, the band being drawn sufficiently tight, so that the elasticity thereof will tightly close the orifices in the bark of the tree.

The operation of the device is as follows: The insects, in crawling up the tree, are stopped by the trap and collect under it. To destroy the insects the edge of the band is turned up, when the insects are revealed to view and may be destroyed. The band is then turned back for another catch.

The band is made of elastic material, so as to allow its inversion at will to bring to light the insects.

Having thus described my invention, what I claim as new, and desire to secure by Letters Patent, is—

The insect-trap herein described, composed of circular elastic band A, with ribs or studs B, applied and adapted to operate substantially as and for the purposes described.

In testimony that I claim the foregoing, I have hereunto set my hand this 29th day of October, 1875.

AMOS B. SPROUT.

Witnesses:
 THEODORE HARMAN,
 CHARLES E. SPROUT.